Sonnekalb & Lieb.
Travelling Bag.
No. 3,273. Reissued Jan. 19, 1869.
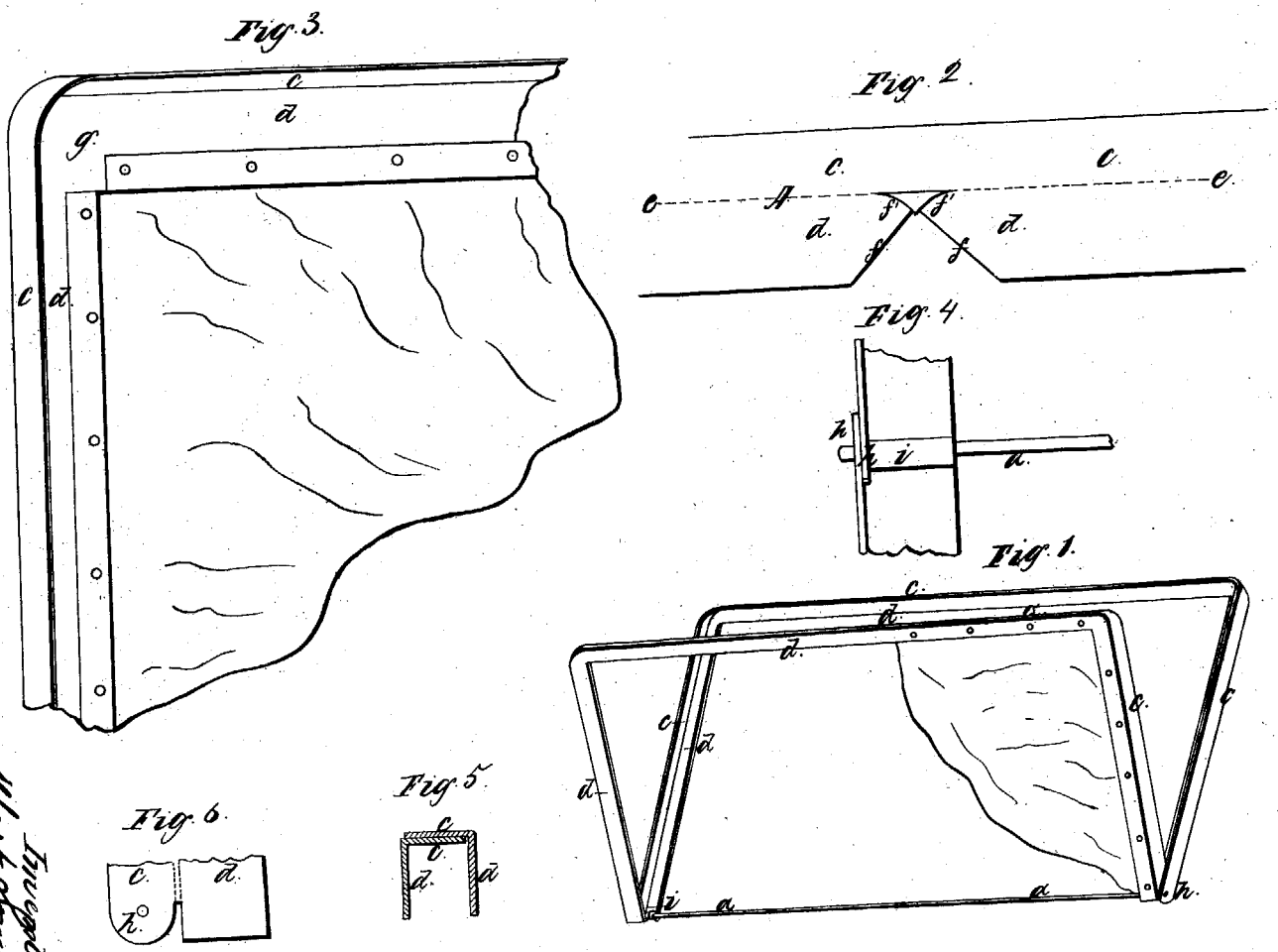
Witnesses:
P. J. Dodge
Theo. Yates.
Inventor:
Albert Sonnekalb
J. G. Lieb
by their Attys
Dodge & Mann
N. PETERS, PHOTO-LITHOGRAPHER, WASHINGTON, D. C.

United States Patent Office.

ALBERT SONNEKALB AND JOHN W. LIEB, OF NEWARK, NEW JERSEY.

*Letters Patent No.* 57,399, *dated August* 21, 1866; *reissue No.* 3,273, *dated January* 19, 1869.

IMPROVEMENT IN CARPET-BAG FRAMES.

The Schedule referred to in these Letters Patent and making part of the same.

*To all whom it may concern:*

Be it known that we, ALBERT SONNEKALB and JOHN W. LIEB, of Newark, in the county of Essex, and State of New Jersey, have invented certain new and useful Improvements in the Construction of the Jaws or Frame for Carpet-Bags or Travelling-Sacks; and we do hereby declare that the following is a full, clear, and exact description and specification thereof, reference being hac to the accompanying drawings, and to the letters of reference marked thereon, like letters indicating like parts wherever they occur.

In the said drawings—

Figure 1 is a view in perspective of a bag-frame constructed according to our invention;

Figure 2 represents a portion of the sheet-metal strip of which one of the jaws of the frame is formed, previous to the bending of such strip;

Figure 3 represents a perspective view of a part of one jaw and the adjacent portion of the bag;

Figure 4 represents a view of the hinge of the frame;

Figure 5 represents a transverse section of the jaws; and

Figure 6 represents a view of the end of the strip of metal cut for the formation of the hinge.

In the manufacture of the frames of travelling-bags or sacks, it has heretofore been customary to construct the jaws or frames of several separate pieces of metal and wood, united by rivets, screws, &c., thus rendering them complicated and expensive, and at the same time not shutting together as compactly and securely as is designed.

Our invention has for its object the obviating of these objectionable features, and at the same time, while producing a stronger and better article, to also make them simpler and cheaper.

In the first place, it is desirable to form the jaws entirely of metal, having an L-section, in order to give them strength laterally; and, secondly, it is desirable to form them of thin, light strips of metal, so bent as to secure great strength and rigidity, without rendering them clumsy or heavy; third, it is an object to so construct them that each jaw shall consist of a single continuous strip or piece of metal that can be wrought into the required form with the least possible amount of labor; and, fourth, it is desirable that the two jaws should be firmly hinged together.

To accomplish these objects, we construct our improved jaws of a single strip of sheet-metal, as represented by A of fig. 2.

This strip, which at first consists of a plain, flat strip, of uniform width, and of suitable length to form a jaw, has a line, *e*, drawn longitudinally on it, (as represented in fig. 2,) as a guide, along which it is subsequently to be bent lengthwise, at right angles, to form what is termed a "box-jaw," a cross-section of which shall be L-shaped, as shown in fig. 5.

Preparatory, however, to this bending, the point where the corner of the jaw is to be formed, is indicated by measurement, and a portion of the metal in the part *d*, which is to form the perpendicular part of the jaw, is cut through transversely, while that portion, *c*, which forms the flat part of the jaw, is not cut.

The mode in which we prefer to cut the metal is shown in fig. 2.

The cut is made along the lines *f f* in straight lines, standing at right angles to each other, to near the line *e*.

From the inner extremities of the lines *f*, the cut is continued along the lines *f'* in a curve, as shown, and thence along the line *e*, from the extremity of one line, *f'*, to that of the other.

After this operation is completed at each of the two corners, the strip is bent lengthwise along the line *e*, so as to cause the parts *c* and *d* to stand at right angles to each other, as heretofore described, and as shown in figs. 3 and 5

The strip A being thus partially cut through at the corners, and bent lengthwise along the line *e*, is next bent transversely at each corner, so as to bring the edges *f* in contact, as shown at *g*, fig. 3, this bending drawing the part *c* tightly against ths edges *f*, and thus forming a slightly rounded corner on the outside, as shown in figs 1 and 3.

When thus bent into proper shape, the joint at the edges *f* and *e* is secured, which may be done by soldering, brazing, or riveting, to render it tight and firm.

One jaw of the frame is made a little smaller than the other, so as to enter into it, as shown at figs. 1 and 5, and the two are connected at their ends by hinges.

We construct the hinge as shown in figs. 4 and 6, said figures representing the form in which the ends of the strips are cut to form the hinge, and also the hinge, after it is formed and united by the rod *a*, which should extend entirely across the bottom of the frame, from end to end, as represented in fig. 1.

In this hinge the joint-rod *a* not only passes through the thin ears *h h*, but also through a tube, *i*, formed by bending the end of the portion *d* of one jaw into a tube; and as this tube extends longitudinally along the joint-pin *a*, a hinge of much greater rigidity is obtained than if the joint-rod or pivot extended merely through the thin ears.

It will, of course, be understood that these cuts, both at the corners and at the ends where the hinges are made, may be made by punches or dies operated by machinery, as is usual in working sheet-metal, it only being necessary to have the dies or cutting-tools of suitable shape to make the cuts of the desired form.

It will thus be seen that by our mode of construction, each jaw may be formed of a single continuous strip of sheet-metal, which, by a very simple and cheap process, is formed into a "box" or L-form transversely, thereby producing a very cheap, strong, rigid, and light frame, composed entirely of metal.

It will also be observed that jaws thus constructed, when closed, have their inner edges shut past each other, thus interlocking, or shutting one within the other, and as the portions *c* of the jaws lie in the direction in which the jaws close, it is evident that they will be very rigid and strong, in proportion to the quantity of metal used, and that they cannot be easily forced open when locked, and will not spring apart, or gape, as the old-fashioned flat jaws usually do.

The portions *d*, presenting in like manner their edges, to resist strain brought upon them when standing either edgewise or endwise, will also render the jaws rigid in that direction, and thus tend to prevent injury from weights resting on the bag when travelling, or by its being thrown carelessly about, as is very commonly the case with such articles.

We are aware that jaws having the L-shape, as herein described, have previously been made of narrow strips of metal for small articles, said jaws being formed by forging or swaging the narrow strip into that form; but it is obvious that strips of sheet-metal, such as we use for making the jaws herein described, cannot be thus formed and then bent at the corners without great difficulty and danger of breaking the metal, because, in order to give to the jaws the requisite strength and rigidity when formed of sheet-metal, the portions *d c* must both be of much greater width than in the jaws used on the small articles referred to.

We do not, therefore, claim broadly a box or L-shaped jaw, irrespective of the manner of constructing the same; but having thus fully described our invention,

What we claim, is—

1. A box or L-shaped jaw for a travelling-bag, constructed of sheet-metal, partially cut through transversely and bent lengthwise and transversely, substantially as before set forth.

2. Also, the combination of a box-jaw, constructed of sheet-metal, as before set forth, with a second jaw, of box-form, by means of hinges, the whole forming a complete box-formed frame for a travelling-bag, substantially as before set forth.

3. Also, the hinge, constructed by combining the joint-rod with both an ear and a tubular part of the jaw, substantially as before set forth.

ALBERT SONNEKALB.
J. W. LIEB.

Witnesses:
RICHARD SONNEKALB,
OTTO DORNFELD.